United States Patent [19]

Nicholson

[11] 3,712,586

[45] Jan. 23, 1973

[54] SPARE TIRE EXTRACTOR ASSIST DEVICE

[75] Inventor: Myron M. Nicholson, Livonia, Mich.

[73] Assignee: Ford Motor Company, Dearborn, Mich.

[22] Filed: Sept. 27, 1971

[21] Appl. No.: 184,131

[52] U.S. Cl..................................254/1, 224/42.21
[51] Int. Cl..............................B66f 1/00, B66d 1/00
[58] Field of Search............254/1; 224/42.12, 42.21

[56] References Cited

FOREIGN PATENTS OR APPLICATIONS 769,945   6/1934   France...........................224/42.21

Primary Examiner—Othell M. Simpson
Attorney—Keith L. Zerschling and John J. Roethel

[57] ABSTRACT

An extractor device for assisting in the removal of a spare tire and wheel assembly from a deep storage well or recess adjacent a vehicle body interior side panel. The extractor device comprises a sling adapted to be draped across the bottom of the recess. The sling is anchored to a vehicle body structure at one of its ends and equipped with a pull cable at its other end. The sling is adapted to be raised to a height at which the spare tire and wheel assembly can be tilted onto the vehicle floor adjacent the recess.

4 Claims, 5 Drawing Figures

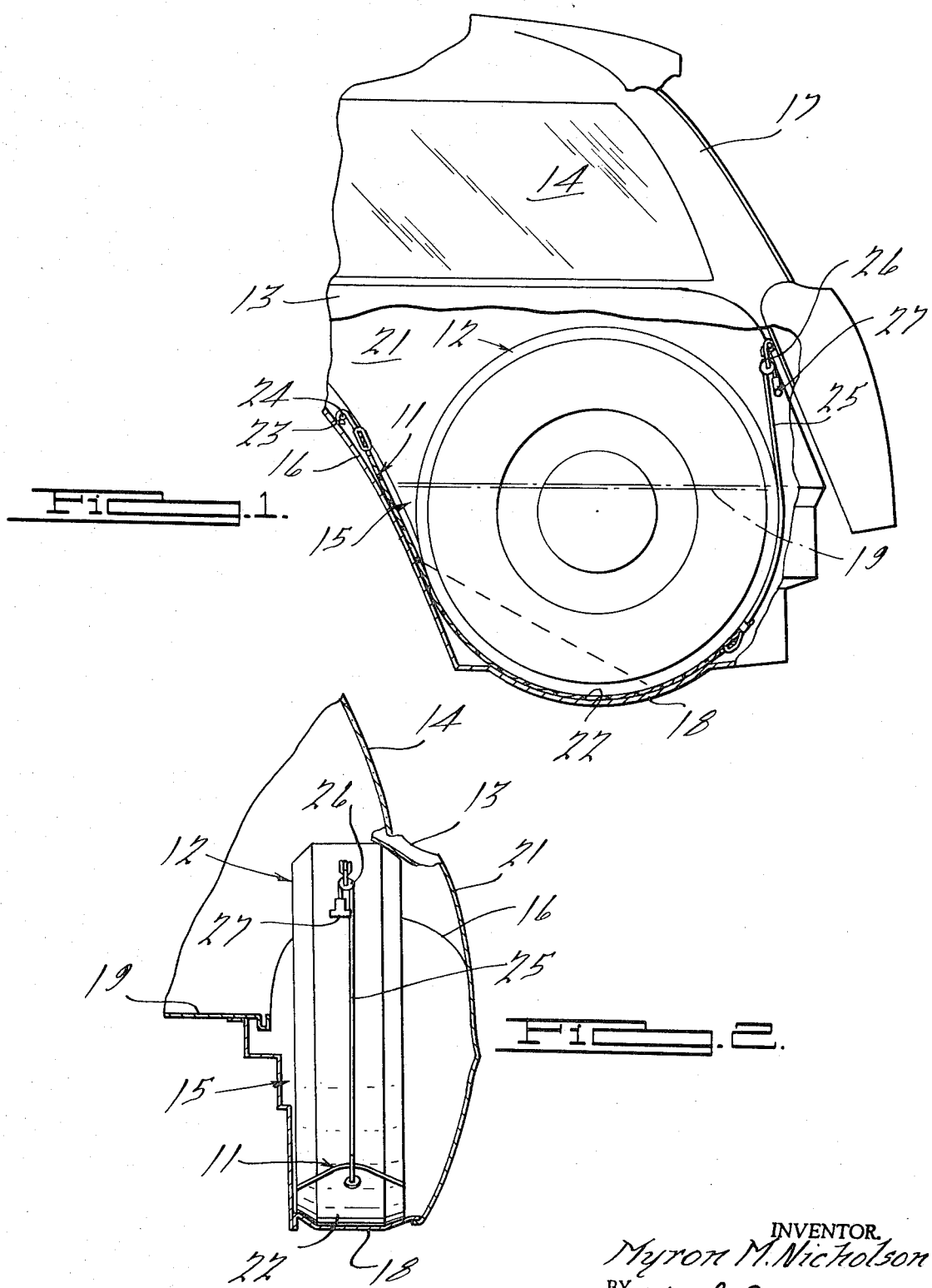

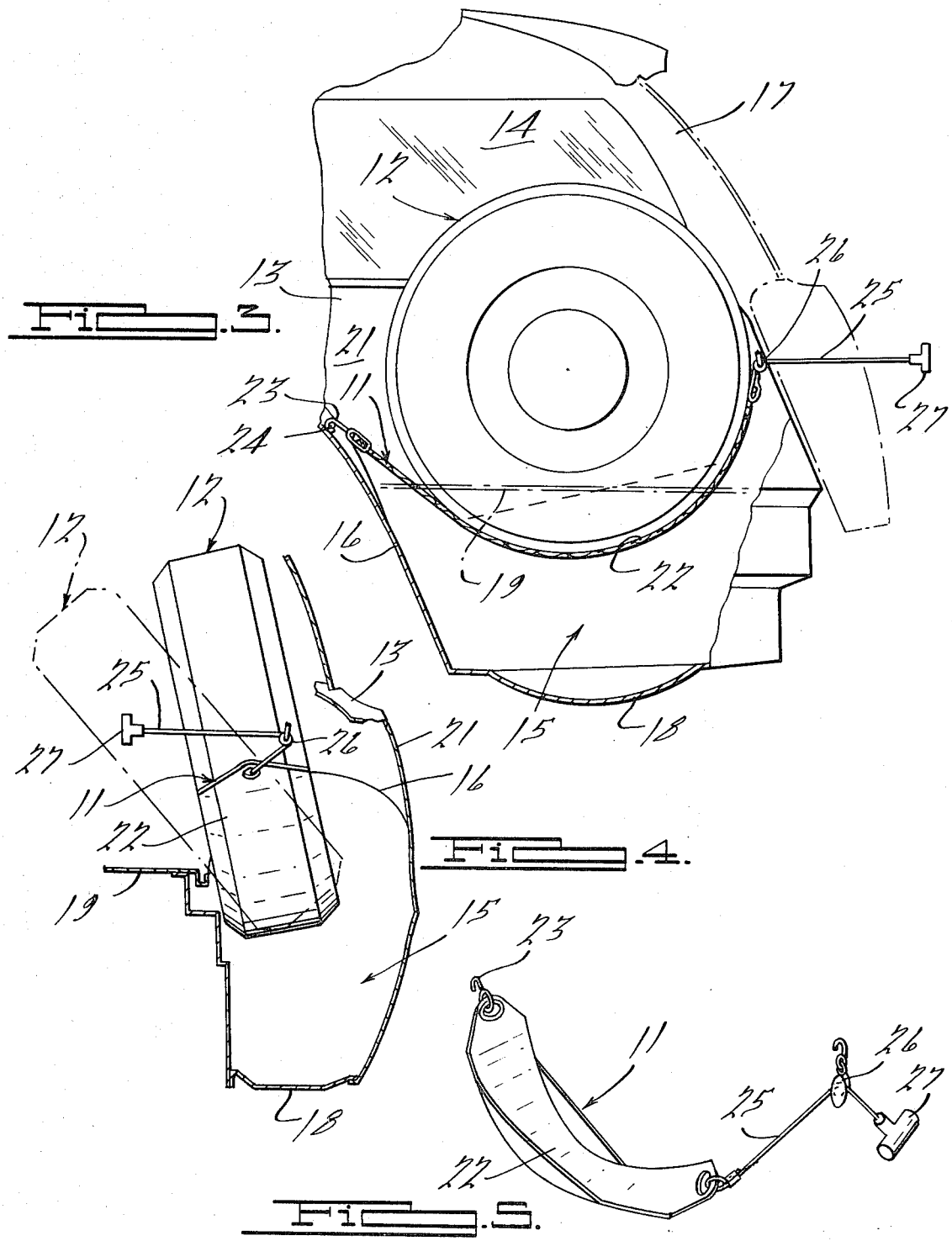

SPARE TIRE EXTRACTOR ASSIST DEVICE

BACKGROUND OF THE INVENTION

In some types of vehicles, particularly station wagons, the spare tire and wheel assembly is stored in a quarter panel well or recess. The quarter panel well is a longitudinally extending recess located in the rear quarter panel of the vehicle body between the rear wheel housing and the rearmost body pillar structure. The tire is positioned in the recess or well in a substantially upright position. The recess or well has a depth below the station wagon floor board slightly in excess of the radius dimension of the spare tire. The spare tire must be bodily lifted out of the recess or well a substantial distance before it can be tilted over onto the floor board for subsequent removal from the vehicle.

It is an object of the present invention to provide a simple spare tire extractor assist device which will enable a relatively weak person to get sufficient leverage to extract the tire and wheel assembly from the storage well.

SUMMARY OF THE INVENTION

The present invention relates to an extractor device for assisting in the removal from a vehicle storage well of a wheel mounted spare tire. The extractor device comprises a sling adapted to be draped across the bottom of the storage well and on which the spare tire is positionable. Anchor means anchors one end of the sling in proximity to one wall of the storage well. A pull cable is attached to the other end of the sling. A guide means receives the pull cable to control the direction of lift of the sling. A pull means or handle is coupled to raise the sling and a wheel mounted spare tire positioned thereon from the wheel well. The spare tire can be raised a sufficient distance so that it will fall over onto the vehicle floor board where it is readily accessible for removal from the vehicle.

DESCRIPTION OF THE DRAWING

Further features and advantages of the present invention will be explained in greater detail making reference to the description which now follows, reference being had to the drawings in which:

FIG. 1 is a fragmentary interior side view of a rear quarter panel of a station wagon body diagrammatically illustrating a spare tire and wheel assembly in stored position;

FIG. 2 is a rear elevation, in part sectional, of FIG. 1.

FIG. 3 is a view in part similar to FIG. 1 with the spare tire and wheel assembly raised a substantial distance out of the storage well or recess;

FIG. 4 is a rear end elevation in part similar to FIG. 2 with the spare tire and wheel assembly shown in raised position; and FIG. 5 is a perspective view of the spare tire extractor assist device embodying the present invention.

DETAILED DESCRIPTION OF THE INVENTION

As indicated in FIGS. 1 to 4, inclusive, the spare tire extractor assist device, generally designated 11, is particularly adapted for use in a station wagon type vehicle. In the conventional station wagon, the most convenient and least useful space absorbing spare tire and wheel assembly 12 storage area has been found to be the right rear quarter panel area of the vehicle body 13. The spare tire and wheel assembly is stored in an upright position beneath the rearmost window 14 of the body 13.

To accommodate the tire and wheel assembly, an elongated well or recess 15 is provided. The recess extends from the rear wheel housing 16 to the rearmost or D-pillar 17 of the station wagon body. The bottom wall 18 of the recess is a substantial distance below the station wagon floor 19. As illustrated, the depth of the recess or well is more than half the diameter of the wheel and tire assembly.

The outer wall of the recess or well 15 is the outer panel 21 of the vehicle body.

The spare tire extractor assist device 11 comprises a sling 22 adapted to be draped across the bottom of the recess 15. Anchor means comprising a hook 23 attached to one end of the sling is adapted to engage a ring or eye 24 secured to the interior surface of the wheel housing 16. The hood 23 fixedly holds the sling 22 in place at one end of the recess 15.

A pull cable 15 is attached to the other end of the sling 22. The pull cable 25 passes through a guide means in the form of a swivel pulley 26. The swivel pulley is anchored to the rearmost or D-pillar of the vehicle body at a place substantially above the vertical midpoint of the spare tire and wheel assembly 12 when the latter is positioned in the storage well or recess 15.

OPERATION

The operation of the spare tire extractor assist device 11 embodying the present invention is as follows: Prior to the insertion of a spare tire and wheel assembly 12 into the storage recess 15, the sling 22 is draped across the bottom of the well to substantially follow the contour of the latter. The spare tire and wheel assembly is then dropped into the well and bolted in place by conventional holding means (not shown). Ordinarily, removal of the spare tire and wheel assembly from the storage well or recess is an awkward chore. It is more or less necessary to climb into the vehicle and then from a kneeling position to raise and tilt the tire out of the deep well. The leverage conditions are most unfavorable.

With the extractor assist device 11 of the present invention, it is only necessary, after the tire and wheel assembly has been unclamped from its retaining device, to pull on the pull handle 27 attached to the cable 25. Since this can be done from a standing position to the rear of the vehicle, the person removing the spare tire is able to brace themselves and to exert the necessary force in a more efficient manner than if done from a kneeling position. As the spare tire and heel assembly is raised from the bottom of the well to an intermediate position as shown in solid outline in FIG. 4, the tire becomes vertically unstable and tips over as indicated in dot and dash outline in FIG. 4. The spare tire and wheel assembly will fall over onto the floor 19 where it may be easily dragged out of the vehicle.

It will be understood that the invention is not to be limited to the exact construction shown and described, but that various changes and modifications may be made without departing from the spirit and scope of the invention as defined in the appended claims.

What I claim is:

1. An extractor device for assisting in the removal from a vehicle storage well of a wheel mounted spare tire, the extractor device comprising a sling adapted to be draped across the bottom of the storage well on which the spare tire is positionable, anchor means anchoring one end of the sling in proximity to one wall of the storage well, a pull cable attached to the other end of the sling, guide means receiving the pull cable to control the direction of lift of the sling, and pull means coupled to the cable through which the latter may be operated to raise the sling and a wheel mounted spare tire positioned thereon from the wheel well.

2. An extractor device according to claim 1, in which:

the guide means comprises a swivel pulley mounted on a vehicle body structural member.

3. A handling device for extracting a spare tire and wheel assembly from a storage compartment in a vehicle body, the storage compartment comprising a recess in a vehicle floor, the recess being located adjacent a side wall of the vehicle body between a rear wheel housing and the rearmost body pillar, and the recess being relatively narrow and of a depth to receive the tire and wheel assembly in a substantially upright position, the handling device comprising a sling means adapted to be longitudinally draped across the bottom of the recess and on which the spare tire and wheel assembly is positionable, anchor means anchoring one end of the sling means to the wheel housing, cable means attached to the other end of the sling means, guide means receiving the cable means to control the direction of lift of the sling, and pull means coupled to the cable means through which the latter may be operated to raise the sling means to a height at which the spare tire and wheel assembly can be tilted onto the vehicle floor adjacent the recess.

4. A handling device according to claim 3, in which:

the guide means comprises a swivel pulley means secured to the rearmost body pillar at a point above the vertical midpoint of the spare tire and wheel assembly.

* * * * *